United States Patent [19]

Born

[11] Patent Number: 4,767,333

[45] Date of Patent: Aug. 30, 1988

[54] LASER EVOLVED MODELS

[76] Inventor: Grant R. Born, 2687 44th St., SE., Grand Rapids, Mich. 49508

[21] Appl. No.: 85,565

[22] Filed: Aug. 17, 1987

[51] Int. Cl.$^4$ .............................................. G09B 23/28
[52] U.S. Cl. ..................................... 434/262; 434/267
[58] Field of Search ............... 434/262, 267, 268, 272, 434/218, 21, 22; 250/491.1; 128/303.1, 395

[56] References Cited

U.S. PATENT DOCUMENTS

| | | | |
|---|---|---|---|
| 3,310,885 | 3/1967 | Alderson | 434/267 |
| 4,286,168 | 8/1981 | Carr | 434/262 |
| 4,481,001 | 11/1984 | Graham et al. | 434/267 |
| 4,493,653 | 1/1985 | Robbins et al. | 434/262 |

*Primary Examiner*—James C. Yeung
*Attorney, Agent, or Firm*—Robert K. Wallor

[57] ABSTRACT

A family of laser evolved models providing laser surgical teaching and proficiency practice targetry. A first model element, comprising a rectangular sheet of laser impervious material having arrays of laser vaporizable markings imprinted thereon, provides targetry for exercising controls of a surgical laser governing spot size and power level of a laser beam therefrom, and of an associated micromanipulator in directing the laser beam to specific target elements of the arrays and in traversing the laser beam across and around each such target element. Further model elements, provided as replicas of portions of the human anatomy, each pre-formed with a plurality of indentations which serve as receptacles for appropriate volumes of a suitable laser vaporizable material simulating laser surgically treatable lesions. Said indentations are of appropriate sizes, shapes, and depths, and are distributed to be representative of lesions of a variety of types such as basal cell carcinomas, keratoses, warts, cysts, and the like. Said anatomical model elements are fabricated of fire-hardened clay substantially impervious to laser vaporization, and may thus be repetitively utilized.

41 Claims, 4 Drawing Sheets

LASER EVOLVED MODELS

BACKGROUND OF THE INVENTION

1. Field of the Invention

This invention relates to medical training devices. More particularly, the herein invention relates to anatomical models for demonstrating, teaching, and practicing laser surgery techniques and procedures, and further relates to the methods of their fabrication and use.

2. Discussion of the Prior Art

The use of lasers as a surgical tool is of relatively recent origin. The transition from experimental procedure to acceptance by the medical profession began in earnest substantially with the onset of the decade of the 1970's. This transition is continuing, with the number of practitioners who are developing techniques and procedures for the office or out-patient use of such devices as a preferred treatment for an increasing variety of surgical problems growing dramatically.

The single most important impediment restraining even more rapid growth in the use of lasers in surgical procedures has been the lack of practical instructional courses and training devices. In other fields of medical practice, such as radio-therapy and ultrasound, anatomical models or phantoms have been developed to serve as training devices. As an example of such inventions, the human skin model described in U.S. Pat. No. 4,481,001 to Graham, et. al. provides an epidermis-simulating elastomer layer, a dermis-simulating elastomer layer, and a subcutaneous tissue-simulating substrate formed of a foamed elastomer. The several layers may be contoured to simulate variations and defects often found in natural skin. The penetration values of the several layers are established, by the appropriate selection of differing elastomer materials, to be within the ranges experienced in human skin inoculation. Intradermal injection of fluids may be demonstrated using such a model. Additionally, training in this procedure, and subsequent practice for maintaining one's skill in this procedure, may be accomplished with the same model, thereby providing human patients with experienced practitioners. After several such uses, the model may be discarded, having been filled with injected fluid.

U.S. Pat. Nos. 3,310,885 to Alderson, 4,286,168 to Carr, and 4,493,653 to Robbins, et. al. disclose phantoms for radio-therapy, scintillation cameras, and ultrasound, respectively. In particular, the Alderson patent discloses the use of an anatomically configured model which is horizontally sectioned to enable organ-simulating materials and/or other materials to be introduced within the phantom such that the practitioner may observe the results of radio-therapy exposure of the phantom in a manner comparable to that to be expected in so treating an actual patient. In the Carr patent, steel ball bearings are used to attenuate gamma rays by embedding them in an orthogonal pattern in a synthetic resinous sheet, thereby providing checks of uniformity, resolution, linearity, distortion, and field size with a single exposure. The patent to Robbins, et. al. provides for simulation of biopsiable lesions within the phantom, which may be biopsied as a method of learning and maintaining the skills necessary to such procedures.

The herein inventor is not aware of any devices similar to those identified hereinabove, nor of any devices similar to those identified and claimed herein, which are adaptable to the training of practitioners in laser surgery. Heretofore, practice in the use of a surgical laser has been performed on an array of fruit, such as apples, oranges, plums, etc., or on pig's feet. While microscopic observation of the effects of laser vaporization of the material of such specimens imparts some of the observable visual appearance to be noted during actual tissue vaporization performed on human patients, in that different strata of the specimens will give differing optically observed returns, such practice methods do not provide for the demonstration and acquisition of necessary skills and experience in laser spot size, power level, and pulse time control. Moreover, in performing laser surgery on patients, several differing types of lesions, such as warts, basal cell cancers, keratoses, etc., each have unique power, width, and depth parameters which may further vary according to the location of such a lesion on the body. A further complication in using a surgical laser arises from the variability in surface configuration of humans. Such earlier use of fruit and the like has proven to be inadequate to enable a fledgling practitioner to gain sufficient expertise to readily exercise his or her techniques on actual patients without risking error, which could result in undue injury to the patient. The hereinbelow disclosed laser evolved models cooperatively provide a means for developing the skills of a practitioner to the level of an experienced, proficient laser surgeon without resorting to training on actual patients.

SUMMARY OF THE INVENTION

Accordingly, it is an object of the present invention to provide laser evolved models useful in training neophyte practitioners in the techniques of laser surgery.

It is another object of the present invention to provide laser evolved models useful by the practitioner in maintaining laser surgical skills through repetitive practice.

It is a further object of the present invention to provide laser evolved models adapted to have pre-formed recesses therein of a plurality of shapes, sizes, and depths representative of a variety of lesions.

Another object of the present invention is to provide laser evolved models that may be repetitively utilized.

A further object of the present invention is to provide laser evolved models that are inexpensive to manufacture.

It is yet another object of the present invention to provide laser evolved models which are substantially impervious to laser radiations of surgical utility and which will provide an appearance, under microscopic observation, of normal tissue when the model surface is exposed to laser radiation.

It is yet a further object of the present invention to provide laser evolved models having general anatomical features, including simulated lesions, commonly encountered in laser surgical procedures capable of being performed in a practitioner's office.

It is still another object of the present invention to provide a family of laser evolved models cooperatively adapted to be useful in a course of instruction progressively developing laser surgical skills.

It is a still further object of the present invention to provide a method of manufacture of a family of laser evolved models useful in teaching laser surgical techniques.

Yet another object of the present invention is to provide a method of utilizing laser evolved models in teaching laser surgical skills and techniques.

These, and other objects, features, and advantages of the present invention are provided by elemental models of portions of the human anatomy, configured to each have a plurality of indentations pre-formed therein, together with a planar felt rectangle imprinted with a plurality of spots of varying sizes and shapes. The elemental laser evolved models may form the basis for practical exercises in the performance of laser surgical procedures, either as a substantial part of a course teaching such techniques or for independent maintenance of such skills through practice.

A first element, comprising a rectangular felt pad imprinted with various spots, serves to familiarize a neophyte practitioner with the several controls of a standard surgical laser and an associated micromanipulator which provide appropriate beam width (spot size) and power level laser control settings and micromanipulation. The anatomical elements, representing, inter alia, hands (both dorsum and palm surfaces) with fingers spread, feet (both dorsum and plantar surfaces) with toes spread, a face having a mouth, lips open, an open nose and no hair, and a cervix attachable to an existing gynecological model. All of the anatomical elements are formed of hard fired pottery clay such that they are substantially immune to vaporization when exposed to laser radiation at the power levels typically utilized during laser surgery. The several indentations pre-formed in each element are representative of the sizes, shapes, and depths of various lesions amenable to laser surgical biopsy and removal. Such indentations are placed on the elements at locations common to the natural occurence of such lesions, and are often at sites requiring significant expertise to enable the practitioner to correctly direct the laser beam to the lesion site without impinging on non-lesion areas of the surface of the model element. By placing a quantity of a suitable laser-vaporizable material in each of the indentations, including any appropriate sculpting of such material outwardly from the model surface to simulate particular lesions, and then using the laser to vaporize said material from each indentation, a neophyte laser surgeon may gain expertise in the removal of such lesions without risk to actual patients. Subsequently, a skilled practitioner may maintain his or her skills at a high level through repeated use of the present invention, replacing the laser-vaporizable material with each use.

BRIEF DESCRIPTION OF THE DRAWINGS

In the accompanying drawings, wherein like numerals and symbols refer to like parts wherever they occur.

DESCRIPTION OF THE PREFERRED EMBODIMENT

Figure 1:
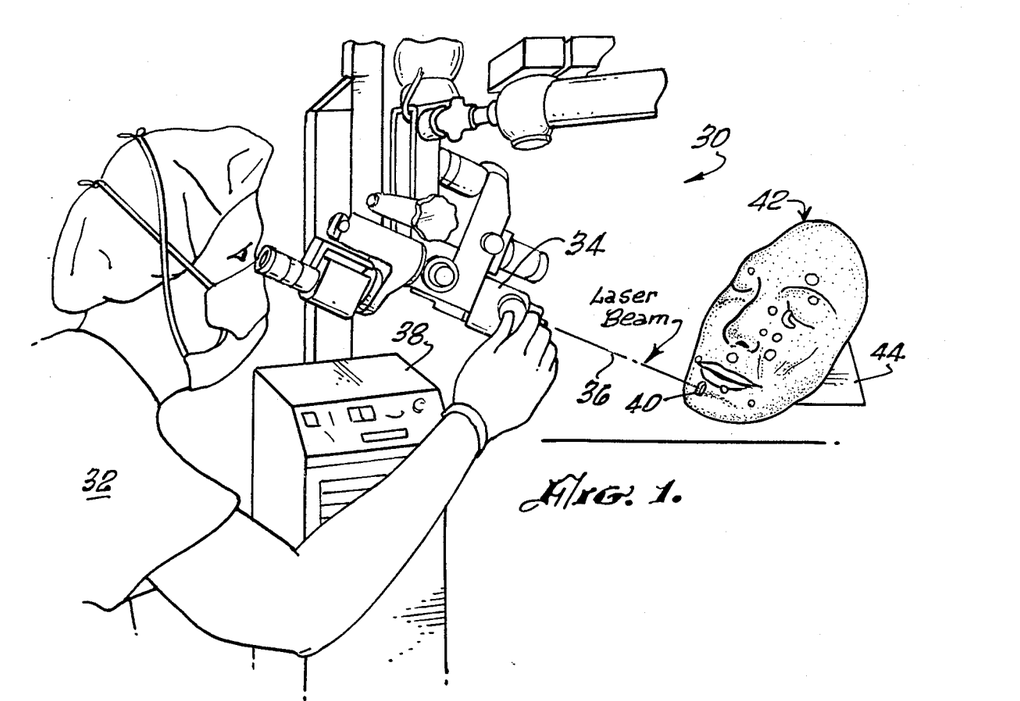
FIG. 1 is perspective overview of a laser surgery apparatus employing an element of the present invention in a practice setting.

Referring first to FIG. 1, a typical laser surgical apparatus, including a representative laser evolved model element in accordance with the present invention, is indicated generally at 30. A practitioner 32 is shown operating a micromanipulator 34, such as model ML 200 A Micromanipulator manufactured by the Minnesota Laser Corporation, to control the direction of a laser beam 36, typically produced by a carbon dioxide laser 38, such as a Portalase 200 Surgical Laser System manufactured by the Minnesota Laser Corporation. The laser beam 36 is shown being directed to a region 40 on a model element in accordance with the present invention replicating a face 42, said face 42 being supported in any convenient position by any opportune support 44.

The practitioner 32 may utilize the system 30 for the demonstration of laser surgical techniques to neophyte practitioners, and such neophyte practitioners may utilize the system 30 for developing and maintaining their skills necessary to practice such surgical techniques.

The present invention resides in the unique family of laser evolved models illustrated in FIGS. 2, 6, 8, 10, 13, 16, and 17, representing, respectively, a face 42, a distal portion of a dorsum pedis 60, a complete plantar surface of a foot 70, a palm surface of a hand 80, a dorsum manus 90, a cervix 100, and an initial familiarization practice element 150. The palm surface of the hand 80 and the dorsum manus 90 may be combined during fabrication to form an entire hand model 84, as illustrated. However, said elements may be retained as individual models, if so desired.

Referring again to FIG. 1, the laser evolved model of the face 42 may be noted to have a plurality of pre-formed indentations 46 of varying size, shape and depth, as will become clear in subsequent paragraphs. Such indentations 46, of which the aforementioned region 40 is an example, provide the preferred target areas for application of the laser beam 36 during practice of the laser surgical procedures. The laser beam 36, having beam width and power level settings appropriately adjustable by controls on the laser 38, may be aimed at a particular indentation 46 and tracked, using the micromanipulator 34, across and around the extent of said particular indentation 46 to duplicate the laser surgical removal of a lesion having dimensions substantially equivalent to said particular indentation 46. By placing a suitable laser-vaporizable material in the particular indentation 46, as will be explained in greater detail hereinbelow, actual practice in tissue laser-vaporization may be accomplished for training and skill maintenance purposes. Moving the laser beam 36 to others of said indentations 46 enables additional practice to be accomplished without repositioning or replacing said laser evolved model face 42. Additionally, replacing the laser-vaporizable material within a particular indentation 46, after a first attempt at laser-vaporization of a first filling of said indentation 46, may allow the practitioner 32 to repeat a particular procedure to correct errors in technique.

Figures 2, 3, 4, 5:
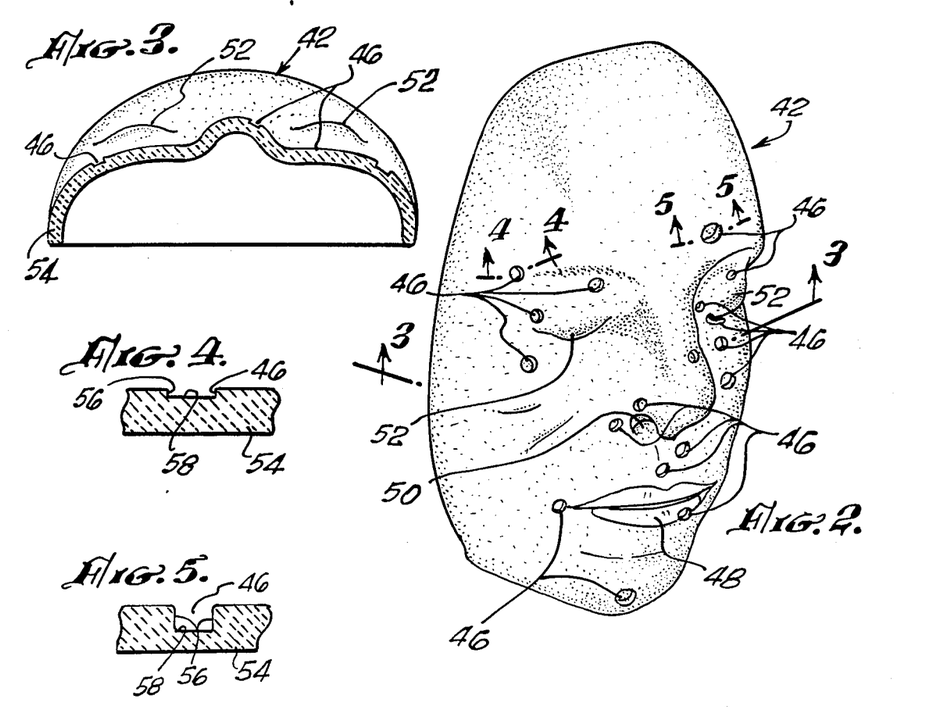
FIG. 2 illustrates, in a perspective view, a face model element in accordance with the present invention.
FIG. 3 provides a cross-sectional view of the face model element of the present invention, taken through the plane 3-3 of FIG. 2.
FIG. 4 illustrates, in a fragmentary cross-sectional view, an indentation of a first representative type, taken through the plane 4—4 of FIG. 2.
FIG. 5 illustrates, in a fragmentary cross-sectional view, an indentation of a second representative type, taken through the plane 5—5 of FIG. 2.

Referring next to FIG. 2, a more detailed depiction of a face 42, in accordance with the present invention, is illustrated. In said face 42, lips 48 are open, nostrils 50 are open, eyes 52 are closed, and no hair is present. The several indentations 46 are randomly distributed about the surface of the face 42 so as to include those locations most subject to lesions, including cysts near the eyes 52 and in the nostrils 50.

Referring next to FIG. 3, the structure of the face 42 is shown to be a thickened layer 54 of fire hardened clay molded into a mask-like form. The several indentations 46 intersected by the cross-section are shown to not pass through the thickness of the layer 54.

Referring next to FIGS. 4 and 5, two types of indentations 46 are illustrated in cross-sections through the layer 54. The distinction to be made from these illustrations is that the several indentations 46 vary in size (area) and depth. Such variations simulate the natural differences between the various lesions that may occur in said regions of the face 42. Additionally, with particular reference to FIG. 5, side walls 56 and a bottom surface 58 of each indentation 46 may be irregularly shaped.

Figures 6, 7, 8, 9, 10, 11, 12:
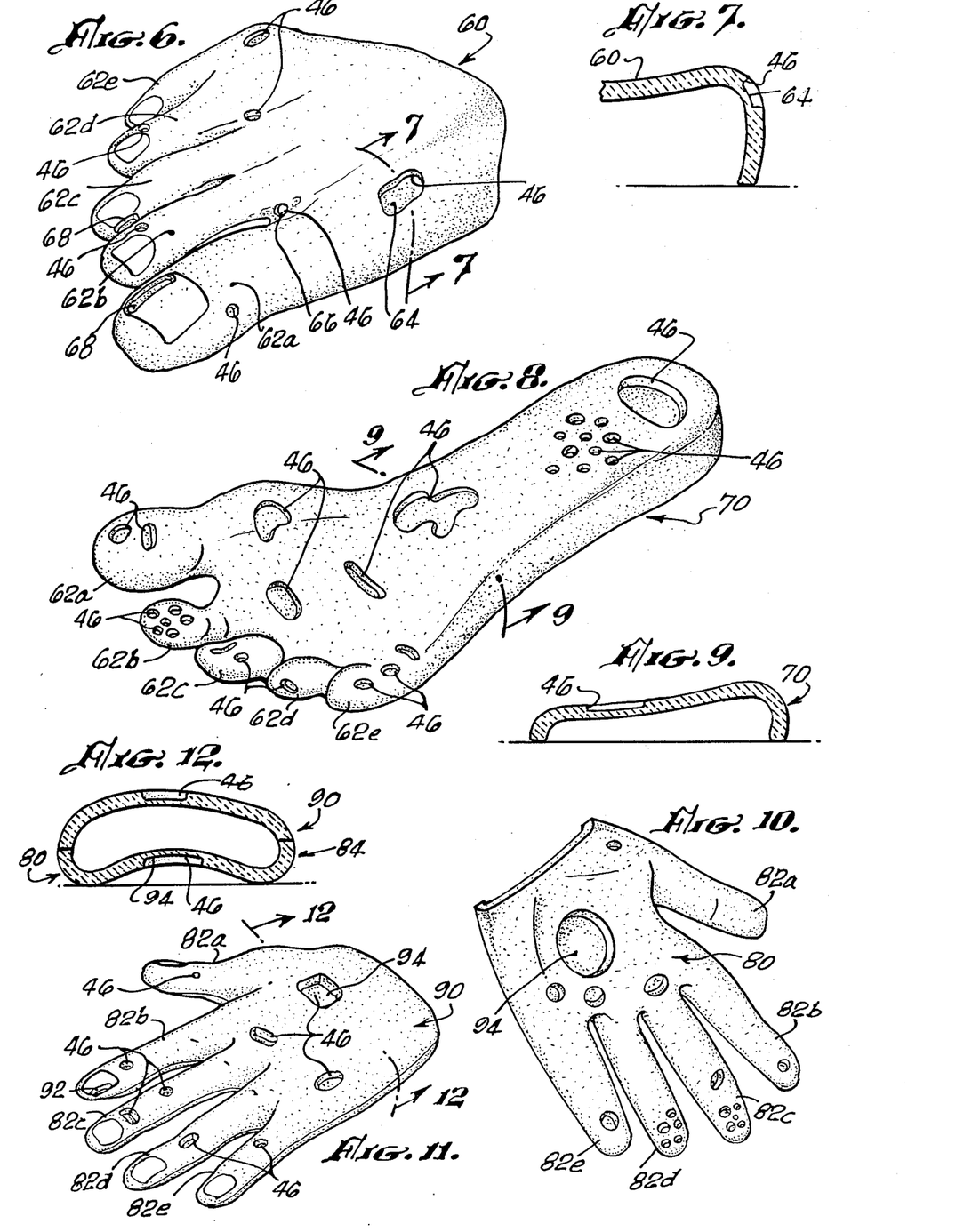
FIG. 6 is a perspective view of a model element of a dorsum pedis in accordance with the present invention, with toe digits spread.
FIG. 7 presents a fragmentary cross-sectional view of a representative indentation formed on the model dorsum pedis, taken through the plane 7—7 of FIG. 6.
FIG. 8 presents a perspective view of a model plantar surface of a foot in accordance with the present invention.
FIG. 9 illustrates, in a cross-sectional view, the structure of the plantar foot surface model element, including a representative indentation, taken through the plane 9—9 of FIG. 8.
FIG. 10 is a perspective view of a hand model element in accordance with the present invention, showing primarily the palm surface therof.
FIG. 11 is a perspective view of a dorsum manus of the hand model element of FIG. 10.
FIG. 12 presents a cross-sectional view of the structure of the hand model element in accordance with the present invention, taken through the plane 12—12 of FIG. 11.

Referring next to FIG. 6, a model of a dorsum pedis 60, from the instep and including the toes 62a through 62e, is molded to have a plurality of indentations 46 pre-formed therein. Said indentations 46 are similar in nature and purposes to those described in relation to the face 42 of FIG. 2. Considering particularly the indentation 46 specially identified as indentation 64, it may be observed that the surface area of such indentations may have irregular shape. Another notable indentation 46, identified as indentation 66, represents lesions that may occur between the toes. The model dorsum pedis 60 is also provided with pre-formed recesses 68 at positions appropriate to surgical removal of a toe nail, as may be observed on toe 62a.

Referring next to FIG. 7, the structure of the dorsum pedis 60 is shown to be that of a molded layer of fire hardened clay without a bottom surface corresponding to a foot sole. As with the face 42 described above, the several indentations 46 pre-formed in the dorsum pedis 60 do not pass through the layer of fired clay.

Referring next to FIG. 8, a model of a plantar surface (sole) of a foot 70 is formed of fire hardened clay so as to have the typical surface irregularities arising from an arch and callousing. The plantar surface model 70 has a plurality of pre-formed indentations 46 distributed thereon, including on the bottoms of the toe digits. Said indentations 46 have differing sizes, shapes, and depths representative of various lesions common to the sole of the foot and the under surfaces of the toes 62a through 62e, such as heavy callouses, plantar warts, and the like. Several of the indentations 46 are provided with substantially large surface area.

Referring next to FIG. 9, the cross-section of the plantar surface model of the foot 70 indicates that it is formed from a layer of clay molded into the appropriate configuration and then fire hardened. Said model 70 has no dorsum surface.

Referring next to FIG. 10, a model of a palm surface of a hand 80 is formed in a manner similar to that of the dorsum pedis 60 of FIG. 6 so as to include a plurality of differing indentations 46 pre-formed thereon in a distribution representative of the locations of occurrence of typical lesions. The model palm 80 includes fingers 82a through 82e, spread so as to enable laser access to the interdigit webs. An obverse side of the hand, a dorsum manus 90, may be present to form a model of an entire hand 84.

Referring next to FIG. 11, a model dorsum manus 90 is molded to have a plurality of pre-formed indentations 46 thereon. The process of fabrication and the characteristics of the dorsum manus model 90 are similar to those previously described in relation to the other above-described model elements. The finger nail regions of the dorsum manus model 90 include pre-formed recesses 92 to serve as laser cutting lines for practice nail removal procedures.

Referring next to FIG. 12, the appropriate matching of the molds forming the palm surface model 80 and the dorsum manus model 90 is indicated, thereby forming a hand model 84. It is to be noted that no indentation 46, regardless of its area or depth, traverses the thickness of the clay layer forming the model. In other words, each of the indentations 46 has a bottom surface 94.

Figure 13:
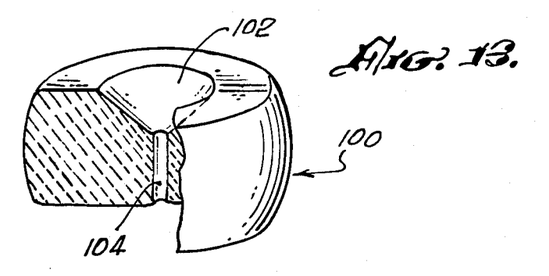
FIG. 13 illustrates, in a perspective view, a typical cervix model element in accordance with the present invention.

Referring next to FIG. 13, a fire-hardened clay model of a cervix 100, having a plurality of pre-formed indentations 46, is illustrated. The primary feature, however, of the laser evolved model of the cervix 100 is a cone shaped cavity 102 centered about a central opening 104 therethrough. Said model cervix 100 may be configured externally so as to be adapted to be mounted within a vaginal cavity of a standard gynecological model (not illustrated). The cone shaped cavity 102 provides a volume into which a quantity of a suitable laser-vaporizable material may be packed for vaporization practice.

Figure 14:
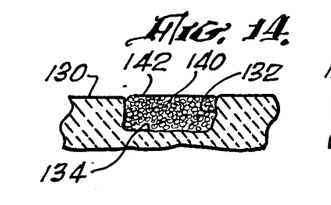
FIG. 14 illustrates a representative indentation in one of the model elements in accordance with the present invention, said indentation having a quantity of a laser-vaporizable material placed therein.

Referring next to FIG. 14, a representative indentation 46, which may be any one of the several illustrated on the several laser evolved model elements described hereinabove, pre-formed in the fire hardened clay 130 of the model element, is shown to have side wall surfaces 132 and a bottom surface 134. Said side wall surfaces 132 and said bottom surface 134 may, in general, have an irregular shape characteristic of natural lesions. To simulate the natural tissue of a lesion, a suitable laser-vaporizable material 140 is placed within the indentation 46 so as to completely fill said indentation 46 and so as to provide a dermal surface 142 configuration typical of the lesion type being modeled.

Figure 15:
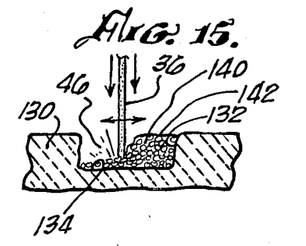
FIG. 15 describes the procedure by which the laser-vaporizable material is vaporized, by a laser beam, from within a representative indentation in accordance with the present invention.

Referring next to FIG. 15, the filled indentation 46 is exposed to a laser beam 36, which is tracked in a generally horizontally illustrated direction across and around said indentation 46 so as to cause the material 140 to be vaporized from the indentation 46 in a layer by layer manner. The herein inventor has determined that, from among the many laser-vaporizable materials available, raw hamburger provides extremely realistic microscopic optical impressions, closely approximating the appearance of natural lesion tissue being vaporized. When the final layer of material 140 has been vaporized from the indentation 46, and the bottom surface 134 of the indentation 46 is impinged by the laser beam 36, the observable optical appearance approximates that observed in actual practice when the laser beam passes from abnormal lesion tissue to underlying or adjacent normal tissue.

Figure 16:
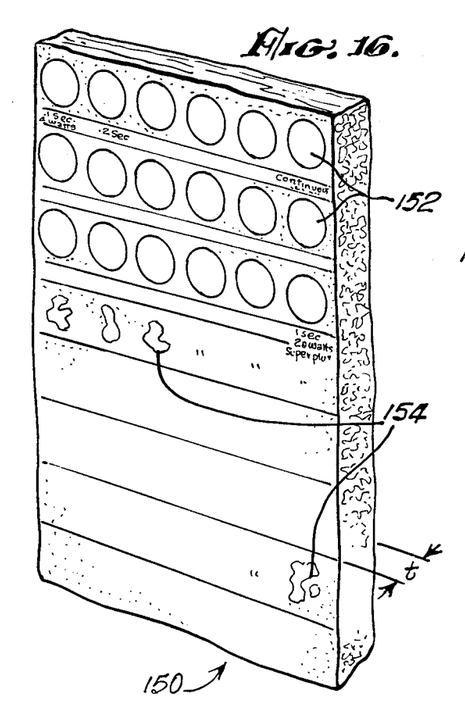
FIG. 16 illustrates a planar rectangular felt element in accordance with the present invention, indicating a plurality of imprinted markings thereon.

Referring next to FIG. 16, in order to acquaint a neophyte practitioner with the rudiments of laser surgical techniques, said student practitioner must become familiar with the controls of the system 30 of FIG. 1 which vary the spot size of the laser beam and its power level, as well as with the controls of the micromanipulator which can move the laser beam laterally in all directions across a target area. The most crucial aspects involved in laser surgery are being able to place the laser beam on the proper area of a patient's anatomy, maintaining the laser beam within the area to be vaporized so as to minimize damage to surrounding normal tissue, providing a laser power level to the tissue appropriate to the type of lesion being treated and appropriate to serve as a cauterizing agent as may be necessary, and being able to detect the transition from excisable lesion tissue to normal tissue.

To assist in the familiarization of a neophyte laser surgeon, the laser evolved models in accordance with the present invention include a planar rectangular sheet of pressed felt having a plurality of markings imprinted thereon. In one form of the present invention, said sheet 150 has a thickness t of approximately one-half inch and is approximately ten inches long by approximately seven inches wide. A first series of markings, comprising a group of circles 152, serves as a practice set for learning the adjustments necessary to control the spot size and power level of the laser beam. The remainder of the planar face of the sheet 150 contains an array of printed markings 154, having a wide variety of irregular shapes, including multiple spots with irregular shapes. The printed markings 154 serve as targets for practice in maneuvering the laser beam by means of the micromanipulator controls.

Figure 17:
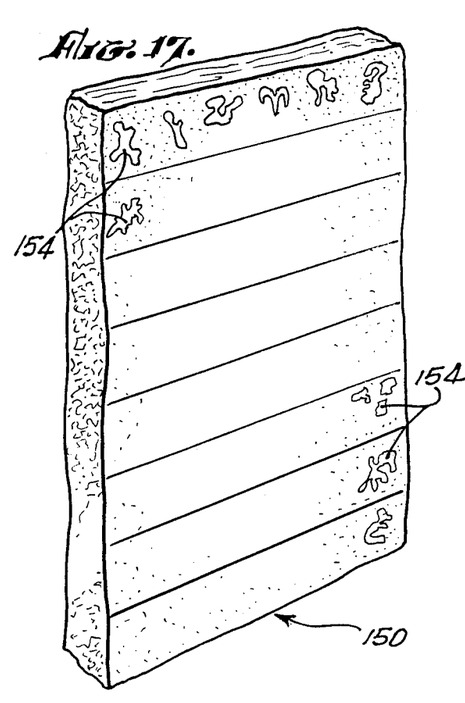
FIG. 17 illustrates the obverse face of the felt element of FIG. 16, indicating a second plurality of markings imprinted thereon.

Referring next to FIG. 17, the obverse face of the sheet 150 is illustrated to show a further array of printed markings 154 provided for additional familiarization practice in micromanipulation of the laser beam. Each of the markings 152 and 154 are imprinted directly on the surfaces of the felt sheet 150 using a laser sensitive red ink, which may be vaporized from the planar surface of the felt sheet 150 under exposure to the laser beam 36.

Figure 18:
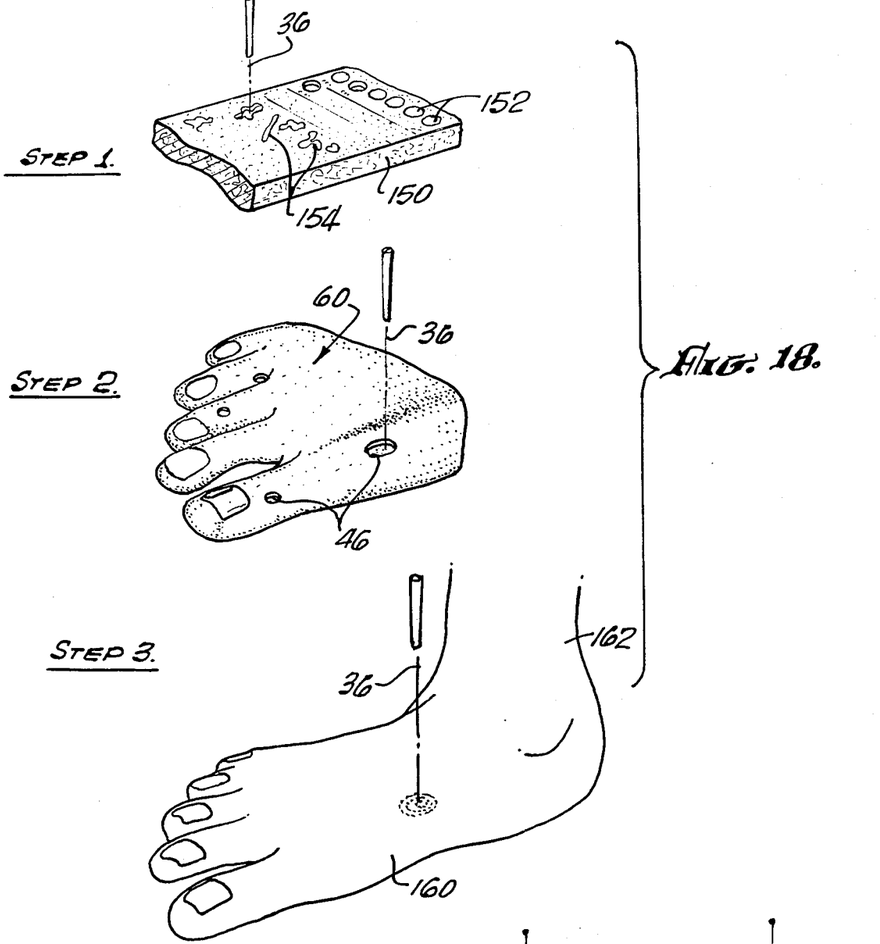
FIG. 18 depicts the procedural steps followed in training a practitioner in the techniques of laser surgery utilizing the laser evolved models in accordance with the present invention.

Referring next to FIG. 18, the steps involved in training a practitioner in the techniques of laser surgery are set forth, as follows:

Step 1: (a) Demonstrate the appropriate spot size and power level settings of the laser, using the array of markings 152; (b) have the student practitioner repetitively perform the control setting exercises on the array of markings 152 until proficiency is attained; (c) demonstrate the micromanipulator operations using the arrays of markings 154 on both faces of the felt sheet 150; (d) have the student practitioner repetitively perform micromanipulative laser exercises using said arrays of markings 154 until proficiency is attained and minimal laser irradiation of areas outside of the markings is achieved.

Step. 2. (a) Provide the student practitioner with the laser evolved anatomical models and a supply of laser-vaporizable material; (b) have the student practitioner fill a plurality of the indentations 46 with said laser-vaporizable material and then operate the laser and micromanipulator to remove the simulated lesions; (c) said procedure to be repeated on all of the pre-formed indentations 46 of all of the laser evolved models until proficiency is attained on the most difficult of the lesion sites.

Step 3. Under supervision, have the student practitioner perform laser surgical procedures on volunteer patients until proficiency is attained.

In FIG. 18, the illustration of step 3 shows a foot 160 and lower leg 162 of a volunteer patient.

Figure 19:
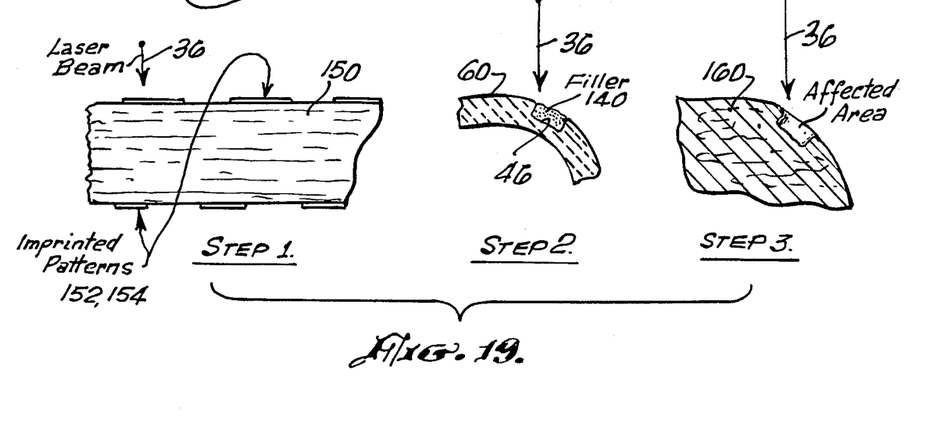
FIG. 19 provides cross-sectional views illustrating the steps in the procedure of training a practitioner in the techniques of laser surgery utlizing laser evolved models in accordance with the present invention.

Referring lastly to FIG. 19, the steps in training a student in the techniques of laser surgery are illustrated by cross-sectional views, showing the effect of the laser beam 36 at each step. In step 1, the laser beam 36 impinges on the imprinted markings and vaporizes the ink without injuring adjacent tissue represented by the felt sheet 150. In step 2, the laser beam 46 vaporizes the filling material 140 from within an indentation 46. In step 3, a lesion on a volunteer patient is excised by laser surgical procedure.

Once a practitioner has attained proficiency in the techniques of laser surgery, such skills may be maintained by independently repeating step 2 of the training procedure set forth hereinabove.

The laser evolved models in accordance with the present invention, in particular the face 42 of FIG. 2, the dorsum pedis 60 of FIG. 6, the plantar surface of the foot 70 of FIG. 8, the palm surface of the hand 80 of FIG. 10, and the dorsum manus 90 of FIG. 11, may be fabricated utilizing typical molding techniques. First, a model of the particular portion of the anatomy is sculpted from modeling clay to include the several indentations 46. Next, the model thus sculpted is stabilized by kiln curing and a mold is formed over the exterior surface thereof. The mold is made of a durable, non-porous material of which there are many examples. The mold thus formed includes projections from its internal surface corresponding to the sculpted indentations of the model. The interior surface of the mold thus formed, after curing and removal of the modeling clay master model, may be appropriately coated with a thin layer of any appropriate material which will facilitate separation of pottery clay from said interior surface of the mold. A quantity of pottery clay is then placed in the interior of the mold and is distributed into a substantially evenly thick layer covering the entire interior surface of the mold, including the indentation-forming projections therein. The shell layer model thus formed is then removed from the mold, kiln cured, and fire hardened to form the finished laser evolved model.

By presenting the above several models as specific examples of the laser evolved models of the present invention, it is intended that the practitioner of this invention devise further anatomical models of other portions of the anatomy as may be useful in teaching, learning, and practicing laser surgery techniques. Thus, the several specific models described herein are considered representative of the generic class of anatomical models so fabricated for such purposes.

This invention and disclosure is intended to cover all modifications, changes, additions, deletions and alternate embodiments that may be reasonably construed to be within the scope and spirit of the above description. The examples set forth hereinabove are not believed by the herein inventor to be limiting of his invention, but rather are expressions of a preferred embodiment from among those conceived by the inventor to be useful. The scope of the present invention is, therefore, to be limited only by the claims appended hereto.

I claim:

1. A laser surgery instructional system, comprising:
   a laser adapted for laser surgery, provided with appropriate controls governing spot size and power level of a laser beam produced therefrom;
   a micromanipulator, optically coupled to said laser, providing means for controlling transverse lateral positioning of said laser beam; and
   a plurality of substantially laser-impervious models providing a multiplicity of laser target areas of increasing difficulty of laser surgical techniques and procedures.

2. The laser surgical instructional system of claim 1, wherein said plurality of substantially laser-impervious models comprises:
   a first type model, adapted to function as laser targetry during familiarization training of a practitioner in the operation and control of said combination of laser and micromanipulator; and
   a set of models of a second type, each adapted to respectively replicate a differing portion of the human anatomy, and each of said models functioning as a substrate for a multiplicity of laser target areas during training of said practitioner in a variety of laser surgical procedures useful in the treatment of lesions and other such medical conditions.

3. The laser surgery instructional system of claim 2, wherein said first type model comprises a substantially rectangular planar element formed of a laser-impervious material, with each of the opposed rectangular planar surfaces of said element having an array of differing laser target areas imprinted thereon.

4. The laser surgery instructional system of claim 3, wherein said rectangular planar element is formed of pressed felt.

5. The laser surgery instructional system of claim 4, wherein said arrays of differing laser target areas comprise:
   a first array of laser target areas provided as printed circular areas adapted for laser spot size and beam power level control familiarization; and
   a second array of laser target areas provided as printed irregularly shaped and sized single and multiple areas adapted for micromanipulator control familiarization, each element of said second array being of a mutually differing shape and size area.

6. The laser surgery instructional system of claim 5, wherein said laser target areas of said arrays are imprinted on said rectangular planar element using a laser vaporizable material.

7. The laser surgery instructional system of claim 2, wherein said plurality of said second type of model comprises:
   a face, having lips open, nose open, eyes closed, and no hair;
   a dorsum pedis, or upper foot surface, having toes spread and toe nails delineated;
   a plantar surface of a foot, having toes spread;
   a palm surface of a hand, having fingers spread;
   a dorsum manus, or back surface of a hand, having fingers spread and finger nails delineated.

8. The laser surgery instructional system of claim 7, wherein each of said models of said second type is provided with a plurality of differing pre-formed indentations in the surfaces thereof, said indentations being substantially representative of examples of lesions, tumors, and the like, of several types amenable to laser surgical procedures, said indentations being appropriately distributed to locations on the model generally corresponding to anatomical sites of lesion occurrence, each of said indentations having an area and a depth substantially matching the dimensional extents of the several types of lesions at several of their respective development stages as may commonly be experienced in nature, each of said indentations being adapted to accept a quantity of laser vaporizable material simulating lesion tissue.

9. The laser surgery instructional system of claim 8, wherein substantially linear indentations are formed along edges of at least a portion of said toe nails and said finger nails so as to facilitate training in laser surgical removal of such digit nails.

10. The laser surgery instructional system of claim 9, wherein said models of the second type are formed of molded, hard-fired pottery clay.

11. The laser instructional system of claim 10, wherein said palm surface of the hand model and said dorsum manus model are assembled after molding to form a hand model before being hard-fired.

12. The laser surgery instructional system of claim 7, further comprising an additional model of the second type representing a cervix, said additional model being fabricated to include a plurality of lesion sites, including a major conical cavity, whereat laser vaporizable material simulating lesion tissue may be localized.

13. In a laser surgery instructional system including:
   a surgical laser having spot size and power level control capability; and
   a micromanipulator adapted to multidirectionally transversely translate a laser beam emanating from said laser so as to controllably direct said laser beam to a desired target;
   the improvement of providing a plurality of laser evolved models adapted for familiarization with, and proficiency training in, laser surgical techniques, and for training in the use of said apparatus for performing such procedures, said plurality of models comprising:

a first type of model adapted as a means for familiarizing a practitioner with said laser and micromanipulator controls; and a second type of model, having a plurality of model elements, each such element duplicating a differing portion of the human anatomy and each such element being provided with a multiplicity of laser target areas representative of operable lesions and the like of various types and of various stages of development that may be typically encountered in such anatomical regions.

14. The improvement of claim 13, wherein said first type of model comprises:

a rectangular planar laser-impervious solid having an array of circular areas imprinted on a portion of a first planar surface thereof, and an array of irregularly shaped and sized areas imprinted on the remainder of said first planar surface and on a second planar surface of said solid obverse to said first planar surface;

said array of circular areas having the imprints of the individual circular areas of various diameters and imprinting densities so as to serve as laser targets during familiarization adjustments of said laser spot size and power level controls; and said array of irregularly shaped and sized areas having the individual areas thereof so configured as to provide laser targets useful for exercising the controls of said micromanipulator to controllably move said laser beam across and around said target areas.

15. The improvement of claim 14, wherein said first type of model is formed of pressed felt, with said arrays being imprinted thereon.

16. The improvement of claim 15, wherein said laser target areas of said arrays are imprinted on said rectangular model of the first type using a laser vaporizable material.

17. The improvement of claim 13, wherein the elements of said plurality of models of said second type comprise:

a face, having lips open, nose open, eyes closed, and no hair;

a dorsum pedis, or upper foot surface, having toes spread and toe nails delineated;

a plantar surface of a foot, having toes spread;

a palm surface of a hand, having fingers spread; and a dorsum manus, or back surface of a hand, having fingers spread and finger nails delineated.

18. The improvement of claim 17, wherein each of said laser target areas of each of said elements comprises an indentation pre-formed in the surface of said model, each said indentation having an area and a depth generally corresponding to similar dimensions of a volume of lesion tissue for a lesion of one of a variety of types of lesions, at one of several stages of lesion development, commonly observable in nature at the regions depicted on said model's surface, said plurality of indentations, including representatives of each type of lesion so typically observed, and each of said indentations being adapted to accept a quantity of a suitable laser vaporizable material to simulate lesion tissue.

19. The improvement of claim 18, wherein substantially linear indentations are formed along edges of at least a portion of said toe nail regions and said finger nail regions so as to facilitate training in laser surgical removal of such digit nails.

20. The improvement of claim 19, wherein each of said model elements is formed of a molded, fire hardened clay impervious to lasar vaporization.

21. The improvement of claim 20, wherein said palm surface of the hand model and said dorsum manus model are assembled after molding to form a hand model before being hard-fired.

22. A laser evolved model for familiarization training of a neophyte laser surgery practitioner in the use and operation of controls associated with a surgical laser in combination with a micromanipulator for positioning a laser beam from said laser onto a particular area with a controlled spot size and power level, said model comprising a rectangular planar element of a laser-impervious material having a first array of circular areas imprinted on a portion of a first planar surface of said element, and having a second array of various irregularly shaped and sized laser target areas imprinted on a remaining portion of said first planar surface and on a second planar surface of said element obverse to said first planar surface thereof.

23. The laser evolved model of claim 22, wherein said rectangular planar element is formed of pressed felt.

24. The laser evolved model of claim 23, wherein said first array of circular areas incorporates variations in the density of imprinting of the several elemental areas of said first array so as to serve as laser targets for different combinations of settings of laser beam spot size and power level control of said associated laser apparatus, and wherein said second array of irregularly shaped and sized areas serves as laser targets for exercising controls of said associated micromanipulator in controllably transversely translating said laser beam across and around each of said areas of said second array without substantially impinging said laser beam on non-imprinted areas of said planar element.

25. The laser evolved model of claim 24, wherein said imprinting is performed using a laser vaporizable material.

26. A laser evolved model of a human face, having lips formed open, nostril formed open, eyes formed closed, and no hair, adapted to serve as a laser target substrate for practicing the performance of laser surgical procedures using an associated surgical laser in combination with a micromanipulator, said face having a plurality of indentations of various areas and depths pre-formed on an outer surface of said face model, said indentations having areas and depths comparable to a volume of lesion tissue observed for a variety of lesions, at a variety of stages of lesion development, as may be found in nature, said indentations beind distributed over said face surface in locations whereat such varieties of lesions may commonly occur on human tissue, each of said indentations being adapted to accept a quantity of suitable laser vaporizable material simulating lesion tissue, said substrate face model being formed of a laser-impervious material.

27. The human face model of claim 26, wherein said model is molded from clay, which is subsequently fire-hardened to a state substantially impervious to laser vaporization.

28. A laser evolved model of a human dorsum pedis, or upper foot surface, having pedal digits included in a spread state, with toe nail regions delineated, said model dorsum pedis having a plurality of indentations of differing areas and depths each representative of a volume of lesion tissue found in a variety of such lesions, at several stages of lesion development, as they may occur in nature, said indentations being distributed over the surface of said dorsum pedis model, including interdigit web regions, in a manner substantially equivalent to locations whereat such varieties of lesions commonly arise in humans, said indentations being pre-formed in the surface of said dorsum pedis model during fabrication thereof, each of said indentations being adapted to accept a quantity of a suitable laser vaporizable material simulating lesion tissue such that a practitioner, utilizing an associated surgical laser in combination with a micromanipulator, may develop skills in performing laser surgical procedures on said anatomical region involving lesions of the types simulated, including removal of toe nails.

29. The model of a human dorsum pedis of claim 28, wherein said model is molded from clay, which is subsequently fire-hardened to a state substantially impervious to laser vaporization.

30. A laser evolved model of a plantar surface of a human foot, having pedal digits included in a spread state, said model plantar surface having a plurality of indentations of differing areas and depths, each of said indentations being respectively representative of a volume of lesion tissue found in one of a variety of such lesions, at one of several stages of lesion development, as they may occur in nature, said indentations being distributed over the plantar surface of said model, including interdigit web regions, in a manner substantially equivalent to a distribution of locations whereat such varieties of lesions may commonly arise in humans, said indentations being pre-formed in the plantar surface of said model during the fabrication thereof, each of said indentations being adapted to accept a quantity of a suitable laser vaporizable material simulating lesion tissue such that a practitioner, utilizing an associated surgical laser in combination with a micromanipulator, may develop skills in performing laser surgical procedures on said anatomical region involving lesions of the types simulated.

31. The model of the plantar surface of a human foot as claimed in claim 30, wherein said model is molded from clay, which is subsequently fire-hardened to a state substantially impervious to laser vaporization.

32. A laser involved model of a palm surface of a human hand, having fingers included in a spread state, said model palm surface having a plurality of indentations of differing areas and depths, each of said indentations being respectively representative of a volume of lesion tissue found in one of a variety of such lesions, at one of several stages of lesion development, as may occur in nature, said indentations being distributed over the surface of said palm surface model, including interdigit web regions, in a manner substantially equivalent to a distribution of locations whereat such varieties of lesions may commonly arise in humans, said indentations being pre-formed in the surface of said palm surface hand model during fabrication thereof, each of said indentations being adapted to accept an appropriate quantity of a suitable laser vaporizable material simulating lesion tissue such that a practitioner, utilizing an associated surgical laser in combination with a micromanipulator, may develop skills in performing laser surgical procedures on said anatomical region involving lesions of the types simulated.

33. The model of the palm surface of a human hand as claimed in claim 32, wherein said model is molded from clay, which is subsequently fire-hardened to a state substantially impervious to laser vaporization.

34. A laser evolved model of a human dorsum manus, or back surface of a hand, having fingers included in a spread state with finger nail regions delineated, said model dorsum manus having a plurality of indentations of differing areas and depths, each of said indentations being respectively representative of a volume of lesion tissue found in one of a variety of such lesions, at one of several stages of lesion development, as may occur in nature, said indentations being distributed over the surface of said dorsum manus model, including interdigit web regions, in a manner substantially equivalent to a distribution of locations whereat such varieties of lesions may commonly arise in humans, said indentations being pre-formed in the surface of said dorsum manus model during fabrication thereof, each of said indentations being adapted to accept an appropriate quantity of a suitable laser vaporizable material simulating lesion tissue such that a practitioner, utilizing an associated surgical laser in combination with a micromanipulator, may develop skills in performing laser surgical procedures on said anatomical region involving lesions of the types simulated, including removal of finger nails.

35. The model of the dorsum manus as claimed in claim 34, wherein said model is molded from clay, which is subsequently fire-hardened to a state substantially impervious to laser vaporization.

36. A laser evolved model of a human female cervix, comprising a solid having a distended generally oblate spheroidal outer surface having a central tubular bore therethrough in a substantially longitudinal direction, and having a substantially conically shaped concave cavity formed on one end thereof centered about said tubular bore, said conical cavity being adapted to accept an appropriate quantity of a suitable laser vaporizable material simulating lesion tissue such that a practitioner, utilizing an associated surgical laser in combination with a micromanipulator, may develop skills in performing laser surgical procedures on said anatomical region involving lesions of the types simulated by such conical cavity.

37. The cervix model of claim 36, wherein said model is molded from clay, which is subsequently fire-hardened to a state substantially impervious to laser vaporization.

38. A method for teaching a neophyte practitioner in the skills, techniques, and procedures of laser surgery, comprising the steps of:

(1) demonstrating the appropriate laser beam spot size and power level control settings of a surgical laser, impinging said laser beam sequentially upon the elements of an array of circular laser vaporizable markings imprinted upon a portion of a first planar surface of a generally rectangular planar laser evolved model element formed of a substantially laser impervious material; having said student practitioner repetitively perform said spot size and power level laser control setting exercises, using said array of circular markings, until proficiency is attained; demonstrating the appropriate operation and control of a micromanipulator associated with said surgical laser, impinging said laser beam sequentially upon the elements of a second array of irregularly shaped laser vaporizable markings imprinted on a remaining portion of said first planar surface, and on a second planar surface obverse thereto, of said generally rectangular planar laser evolved model element, said micromanipulator controls being so exercised as to translate said laser beam across and around each of said elements of said second array; and having the student practitioner repetitively perform said micromanipulator control exercises, using said second array of irregularly shaped markings, until proficiency is attained in vaporizing each of said markings without significantly impinging said laser beam upon unmarked adjacent areas of said planar surfaces of said laser evolved model element;

(2) providing the student practitioner with a set of laser evolved anatomical models, each having appropriately distributed indentations, pre-formed therein, simulating a variety of lesion volumes as to their sizes, shapes, depths, and general anatomical locations; further providing the student practitioner with an appropriate supply of a suitable laser vaporizable material; having the student practitioner fill a plurality of said indentations with portions of said laser vaporizable material; permitting the student practitioner to operate said laser and micromanipulator so as to vaporize said laser vaporizable material from each of the filled lesion locations; and repeating said procedure of filling said indentations and laser vaporizing said material therefrom until proficiency is attained in so treating each of said lesion site indentations on each of said laser evolved anatomical models; and (3) providing direct supervision of the student practitioner, by an experienced laser surgeon, while said student practitioner performs appropriate laser surgical procedures on volunteer patients, said direct supervision to continue until said student practitioner exhibits proficiency.

39. A method whereby an experienced practitioner of laser surgical procedures may maintain proficiency in the performance of such procedures, comprising the steps of:

(1) obtaining a quantity of a suitable laser vaporizable material and a set of laser evolved anatomical models, each of said models having appropriately sized and shaped pre-formed indentations on their respective surfaces, said indentations being substantially representative of the volumes of lesion tissue commonly occuring in nature for a variety of differing types of lesions, said indentations being distributed over the surfaces of said models in a manner generally consistent with the locations at which respective types of lesions are typically found in practice;

(2) filling each of said indentations on each of said anatomical models with an appropriate quantity of said laser vaporizable material to simulate the presence of lesion tissue;

(3) operating the controls of an associated surgical laser and micromanipulator so as to vaporize said laser vaporizable material from each of said indentations on each of said anatomical models, said laser operation to be performed without substantially impinging a laser beam therefrom onto surfaces of said anatomical models adjacent to said indentations; and (4) repeating the procedures of steps 2 and 3 as may be required to maintain proficiency in laser surgical techniques and procedures.

40. A method whereby a practitioner of laser surgical procedures, having available a surgical laser in combination with a micromanipulator, and having available a set of laser evolved anatomical models, each having indentations on their respective surfaces representative of volumes of lesion tissue for a variety of lesion types, each of said indentations being appropriately sized, shaped, and located on the surfaces of said models so as to be generally consistent with the locations, sizes, and shapes of actual lesions arising in nature, together with an appropriate quantity of a suitable laser vaporizable material, may develop skill in a specific laser surgical procedure prior to performance theereof on a patient, said method comprising the steps of:

(1) selecting the appropriate anatomical model from among said set of laser evolved anatomical models, representing that portion of the anatomy upon which said specific laser surgical procedure is to be performed;

(2) selecting the appropriate indentation on the surface of said selected model, from among the plurality of such indentations present, said selected indentation being most representative of the size, shape, depth, lesion type, and anatomical location of the lesion on the patient to be subjected to said specific laser surgical procedure;

(3) filling said selected indentation with a suitable quantity of said laser vaporizable material, molding said material to approximate any surface contours of said patients' actual lesion;

(4) operating the controls of said laser and said micromanipulator so as to traverse a laser beam from said laser across and around said laser vaporizable material in said indentation so as to cause said laser vaporizable material to be completely vaporized from said indentation; and (5) repeating the procedures of steps 3 and 4 until proficiency in performing said specific laser surgical procedure is attained.

41. A process for fabricating laser evolved anatomical models, comprising the steps of:

(1) selecting manageable portions of the human anatomy to be modeled in full scale, using, in the selection process, such factors as anatomical susceptability to laser surgically treatable lesions of differing types, frequency of occurence of such lesions, anatomical contour difficulties in accessing such lesions, and the like;

(2) modeling each of said selected anatomical portions, typically using a thick layer of modeling clay, said models to substantially reproduce all cogent anatomical features, such as digital extremities, protuberances, skin folds, and typical bodily cavities;

(3) forming a plurality of indentations in the surfaces of each of said clay models, each of said indentations being representative of one of a variety of types of lesions, said indentations being formed by the removal of a volume of modeling clay comparable to the volume of lesion tissue typically found in a lesion of the type modeled, said indentations having sizes and shapes comparable to said lesions occuring in nature, said indentations further being distributed on the surfaces of said models at locations typical to the specific types of lesions so modeled, including locations of difficult accessability;

(4) stabilizing said clay models, including said indentations, typically a kiln curing thereof;

(5) placing a thin coating over the outer anatomical surfaces of said models, including within each of said indentations, said coating material to be suitable for enabling said models to be readily separated from other materials without substantial adherence therebetween;

(6) forming a mold over the outer anatomical surfaces of said models, using a suitable material having the characteristic of being sufficiently plastic so as to closely conform to contours of said outer anatomical surfaces of said models and so as to readily fill each of said indentations formed thereon, said mold material having a further characteristic of being curable to a state wherein said molds are durable and non-porous;

(7) curing said molds while married to said clay models;

(8) separating said cured molds from said clay models, exercising care so as to ensure all projections from the surfaces of said molds, corresponding to said indentations of said models, are intact;

(9) suitably coating the surfaces of said molds with a coating enhancing the separability of molded replicas from said molds;

(10) placing a layer of pottery clay adjacent each of the mold surfaces such that said projections on said mold surfaces form indentations in said layers of pottery clay without penetrating said layers, any excess pottery clay being appropriately trimmed away, including from regions whereat bodily cavity openings are to be formed, thereby forming molded replicas of the original models;

(11) curing said pottery clay replicas so formed within said molds sufficiently to enable their separation without distortion of features of the replics, including said indentations, and without damage to said molds;

(12) separating said pottery clay replicas from said molds;

(13) oven hard-firing said pottery clay replica models; and (14) repeating steps 9 through 13 as frequently as desired in order to fabricate further sets of laser evolved anatomical models.

* * * * *